(12) United States Patent
Paranchych et al.

(10) Patent No.: US 7,299,064 B1
(45) Date of Patent: Nov. 20, 2007

(54) AUTOMATIC ADAPTATION OF FUNDAMENTAL CHANNEL RESERVED POWER THRESHOLD

(75) Inventors: David Paranchych, Richardson, TX (US); Farid T. Khafizov, Plano, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 637 days.

(21) Appl. No.: 10/323,291

(22) Filed: Dec. 18, 2002

(51) Int. Cl.
*H04B 7/00* (2006.01)
(52) U.S. Cl. .................. 455/522; 455/450; 455/452.1; 455/453; 370/318
(58) Field of Classification Search .............. 455/69, 455/450, 452.1, 522, 451, 452.2, 453; 370/318
See application file for complete search history.

(56) References Cited

U.S. PATENT DOCUMENTS

| | | | |
|---|---|---|---|
| 6,609,007 B1 * | 8/2003 | Eibling et al. .............. 455/522 |
| 6,975,609 B1 * | 12/2005 | Khaleghi et al. ........... 370/335 |
| 2002/0160783 A1 * | 10/2002 | Hotlzman et al. .......... 455/452 |
| 2002/0198014 A1 * | 12/2002 | Miyamoto et al. .......... 455/522 |

* cited by examiner

*Primary Examiner*—Edward F. Urban
*Assistant Examiner*—Raymond S. Dean
(74) *Attorney, Agent, or Firm*—Garlick Harrison & Markison; Bruce E. Garlick; Kevin L. Smith (57) ABSTRACT

A method for operating a base station to service data communications in a cell/sector of a digital cellular wireless system. Data user forward link transmit power within the cell/sector is allocated. A data user Fundamental Channel (FCH) forward link transmit power reserve level upper limit ($f_{d,max}$) and a data user FCH forward link transmit power reserve lower limit ($f_{d,min}$) are set. A data user FCH forward link transmit power reserve level ($f_d$) is initialized. The base station is operated to allocate FCHs to data users within the cell/sector, deallocate FCHs to data users within the cell/sector, allocate SCHs to data users within the cell/sector, and to deallocate SCHs to data users within the cell/sector. The SCHs are allocated so that the data user FCH forward link transmit power reserve level is maintained. Based upon at least one current data user operating condition in the cell/sector $f_d$ is adjusted. Operation prevents $f_d$ from violating $f_{d,max}$ or $f_{d,min}$.

20 Claims, 10 Drawing Sheets

AUTOMATIC ADAPTATION OF FUNDAMENTAL CHANNEL RESERVED POWER THRESHOLD

BACKGROUND

1. Technical Field

The present invention relates generally to cellular wireless systems; and more particularly to the transmission of data communications in cellular wireless systems.

2. Related Art

Cellular wireless systems support wireless communication services in many populated areas of the world. While cellular wireless systems were initially constructed to service voice communications, they are now called upon to support data communications as well. The demand for data communication services has exploded with the acceptance and widespread use of the Internet. While data communications have historically been serviced via wired connections, wireless users are now demanding that their wireless units also support data communications. Many wireless subscribers now expect to be able to "surf" the Internet, access their email, and perform other data communication activities using their cellular phones, wireless personal data assistants, wirelessly linked notebook computers, and/or other wireless devices. The demand for wireless system data communications will only increase with time. Thus, wireless systems are currently being created/modified to service these burgeoning data communication demands.

Significant performance issues exist when using a wireless system to service data communications. Wireless systems were initially designed to service the well-defined requirements of voice communications. Generally speaking, voice communications require a sustained bandwidth over a period of several minutes. Data communications, on the other hand, have very different performance requirements. Data communications are typically bursty, discontinuous, and may require a relatively high bandwidth during data transfer, which may be very short (on the order of a few seconds). To understand the difficulties in servicing data communications within a wireless system, consider the structure and operation of a cellular wireless system.

Cellular wireless systems include a "network infrastructure" that wirelessly communicates with wireless subscriber units within a respective service coverage area. The network infrastructure typically includes a plurality of base stations dispersed throughout the service coverage area, each of which supports wireless communications within a respective cell (or set of sectors). The base stations couple to base station controllers (BSCs), with each BSC serving a plurality of base stations. Each BSC couples to a mobile switching center (MSC). Each BSC also typically directly or indirectly couples to the Internet.

In operation, a wireless subscriber unit communicates with one (or more) of the base stations. A BSC coupled to the serving base station routes voice communications between the MSC and the serving base station. The MSC routes the voice communication to another MSC or to the public switched telephone network (PSTN). BSCs route data communications between a servicing base station and a packet data network that may couple to the Internet.

The wireless link between the base station and the wireless subscriber unit is defined by one of a plurality of operating technologies and standards, e.g., AMPS, TDMA, CDMA, GSM, etc. These operating standards, as well as new 3G and 4G operating standards, define the manner in which the wireless link may be allocated, setup, serviced and torn down. These operating standards must set forth operations that will be satisfactory in servicing both voice and data communications. Each of these next generation systems will be called upon to support high-speed data communications.

In currently deployed digital cellular networks, e.g., 1xRTT networks, both voice and data communications are supported via wireless digital communications. Depending upon particular service provider criteria, base station resources within a cell/sector are divided between voice and data users. In most systems, the service provider desires to limit call blocking for voice users. To accomplish this goal, the number of Walsh codes and the amount of transmit power that may be allocated to data users is limited. 1xRTT systems support two types of forward links for data service, Fundamental Channels (FCHs) and Supplemental Channels (SCHs). FCHs provide the basic data service to data users. SCHs are bursty higher bandwidth channels that are rapidly allocated and deallocated as cell/sector conditions permit. A data user is "blocked" when it cannot be allocated a FCH, i.e., when sufficient data user resources are unavailable for such an allocation.

In order to address this undesirable operation, in 1xRTT systems, each base station is controlled to reserve a certain percentage of available data user resources for FCHs. One technique involves reserving a percentage of available forward link transmit power in a base station for FCHs. Another technique involves reserving Walsh codes for FCH allocation. However, neither of these techniques considers cell/sector loading and the unique needs of wireless subscriber units operating in such a cell/sector.

A need therefore exists for allocation of available data user cell/sector resources among data users to increase throughput but to minimize data user blocking.

SUMMARY OF THE INVENTION

Thus, to overcome the shortcomings of the prior operations, among other shortcomings, a method for servicing data communications in a cell/sector of a digital cellular wireless system dynamically allocates available data user forward transmit power within a cell/sector. This method may be performed in an effort to maximize cell/sector data throughput and to meet a desired level of data user call blocking. The method includes first allocating data user forward link transmit power within the cell/sector, wherein the data user forward link transmit power is the total forward link transmit power that may be allocated to data users within the cell/sector. The method then includes setting a data user Fundamental Channel (FCH) forward link transmit power reserve level upper limit ($f_{d,max}$) that is a maximum portion of the data user forward link transmit power that may be reserved for allocation to data users on FCHs within the cell/sector. Next, the method includes initializing a data user FCH forward link transmit power reserve level ($f_d$) to a value that is less than or equal to the data user FCH forward link transmit power reserve level upper limit.

The base station is then operated to allocate FCHs to data users within the cell/sector, deallocate FCHs to data users within the cell/sector, allocate SCHs to data users within the cell/sector, and to deallocate SCHs to data users within the cell/sector. In these operations, SCHs are allocated so that the data user FCH forward link transmit power reserve level is maintained. Further, based upon at least one current data user operating condition in the cell/sector, the data user FCH forward link transmit power reserve level $f_d$ is adjusted. In making these adjustments, the method prevents the data user FCH forward link transmit power reserve level $f_d$ from exceeding the data user FCH forward link transmit power reserve level upper limit.

The method may also include setting a data user FCH forward link transmit power reserve level lower limit ($f_{d,min}$) that is a minimum portion of the data user forward link transmit power that may be reserved for allocation to data users on FCHs within the cell/sector. When this further limitation is included, the method includes preventing the data user FCH forward link transmit power reserve level from being less than the data user FCH forward link transmit power reserve level lower limit. In any of the embodiments of the present invention, one or more versions of the 1xRTT communication standard may be supported.

With the method of the present invention, in adjusting the data user FCH forward link transmit power reserve level $f_d$ based upon at least one current operating condition in the cell/sector, the method may be accomplished according to a number of embodiments. In a first embodiment of this operation, when a data call is admitted successfully, the method includes decreasing the data user FCH forward link transmit power reserve level $f_d$ by a first step size. Further, with this first embodiment, when a data call is blocked, the method includes increasing the data user FCH forward link transmit power reserve level $f_d$ by a second step size. In this first embodiment, the first step size may be proportional to a desired probability of data call blocking. Further, the second step size may be selected to meet a desired maximum rate at which the FCH forward link transmit power reserve level is allowed to increase. In a second embodiment of this operation, adjusting the data user FCH forward link transmit power reserve level includes adjusting the data user FCH forward link transmit power reserve level $f_d$ to a level that exceeds a current usage level of data user FCH forward link transmit power by a configurable proportionality factor. This second embodiment will minimize data user FCH blocking until the limit $f_{d,max}$ is reached.

According to a third embodiment of the present invention when a FCH allocation request is received, calculations are performed to determine the average FCH transmit power currently in use, i.e., total active FCH transmit power divided by the number of active FCH users. Then, a determination is made as to whether the requested FCH allocation, if made, would cause the FCH forward link transmit power to exceed $f_d$. If so, it is next determined whether $f_d$ can be increased and, if it can, $f_d$ is increased by a first amount. If not, it is next determined whether $f_d$ can be increased and, if it can, $f_d$ is increased by a second amount. The third embodiment may be performed such that $f_d$ is increased by a lesser amount when the FCH can be allocated than when it cannot be allocated. Alternately, the third embodiment may be performed such that $f_d$ is increased by a greater amount when the FCH can be allocated than when it cannot be allocated.

A base station may be operated to accomplish the operations of the present invention. Further, a base station controller (or other cellular wireless system component) may be employed to control the operation of its base stations. Other features and advantages of the present invention will become apparent from the following detailed description of the invention made with reference to the accompanying drawings.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE DRAWINGS

Figure 1:
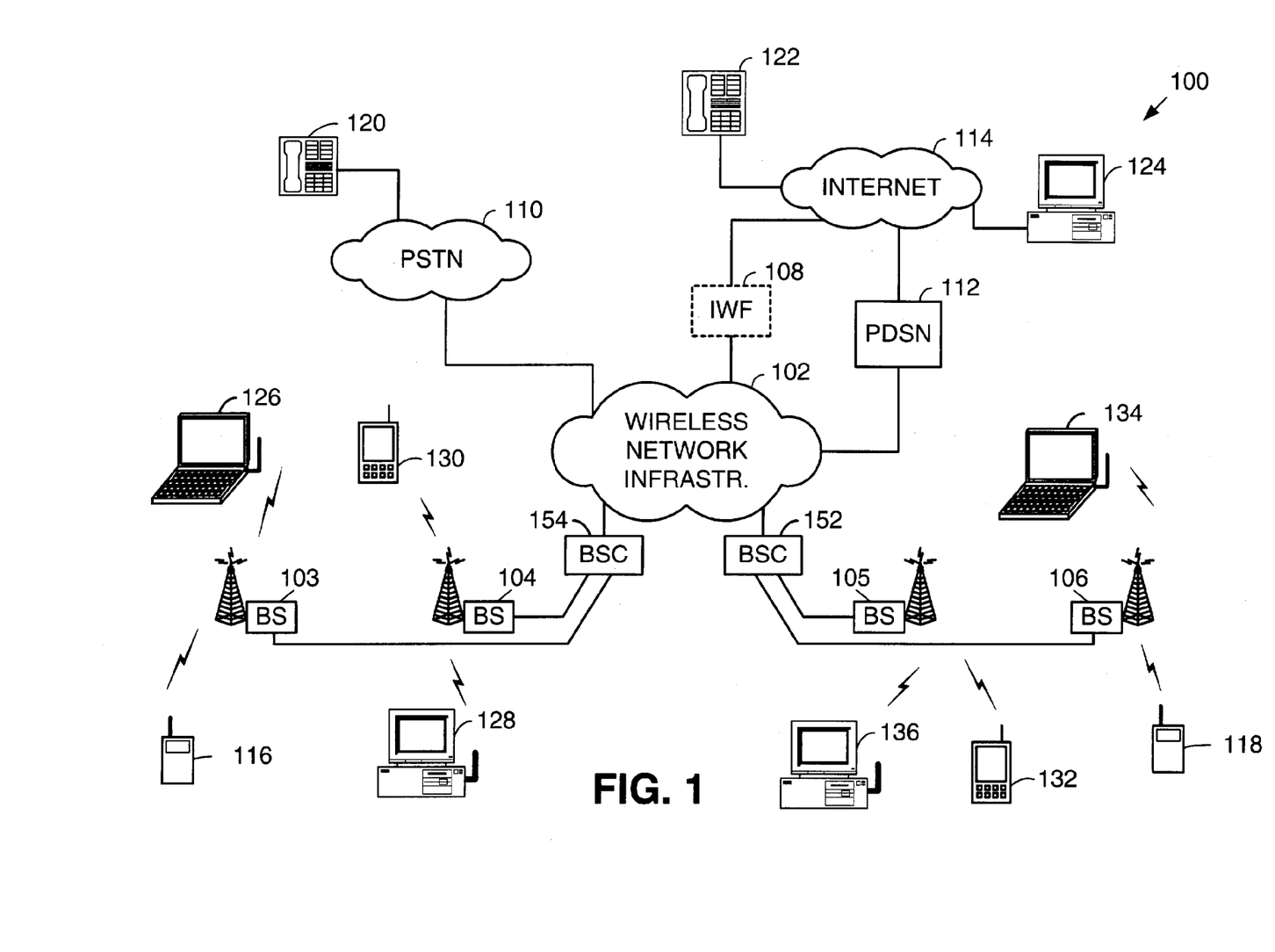
FIG. 1 is a system diagram illustrating a portion of a cellular wireless system constructed according to the present invention.

FIG. 1 is a system diagram illustrating a portion of a digital cellular wireless system 100 constructed according to the present invention. The cellular wireless system 100 includes a wireless network infrastructure 102, base station controllers (BSCs) 152 and 154, and base stations 103, 104, 105, and 106. The wireless network infrastructure 102 couples to the Internet 114. The wireless network infrastructure 102 also couples to the Public Switched Telephone Network (PSTN) 110. In one embodiment of the present invention, the wireless network infrastructure 102 is circuit switched, couples directly to the PSTN 110, and couples to the Internet 114 via an interworking function (IWF) 108. In another embodiment of the present invention, the wireless network infrastructure 102 is packet switched, couples directly to the PSTN 110, and couples to the Internet 114 via a packet data serving node (PDSN) 112.

Each of the base stations 103-106 services a cell/set of sectors within which it supports wireless communications. Wireless links that include both forward link components and reverse link components support wireless communications between the base stations and their serviced wireless subscriber units. These wireless links support digital data communications, VoIP communications, and other digital multimedia communications. The cellular wireless system 100 may also be backward compatible in supporting analog operations as well. The cellular wireless system 100 supports the 1xRTT CDMA 2000 standard and, in other embodiments, supports other digital cellular communication standards.

Wireless subscriber units 116, 118, 126, 128, 130, 132, 134, and 136 couple to the cellular wireless system 100 via wireless links with the base stations 103-106. As illustrated, wireless subscriber units may include cellular telephones 116 and 118, laptop computers 126 and 134, desktop computers 128 and 136, and data terminals 130 and 132. However, the wireless system supports communications with other types of wireless subscriber units as well.

The cellular wireless system 100 operates according to a CDMA standard that has been modified according to the present invention, e.g., 1xRTT (including CDMA 2000A and CDMA 2000B operations), W-CDMA, or another CDMA standard that has been modified according to the operations described herein. The cellular wireless system supports both voice and data traffic. However, operations according to the present invention relate to the service of high-rate data communications. As is generally known, devices such as laptop computers 126 and 134, desktop computers 128 and 136, data terminals 130 and 132, and cellular telephones 116 and 118, are enabled to "surf" the Internet 114, transmit and receive data communications such as email, transmit and receive files, and to perform other data operations. Many of these data operations have significant download data-rate requirements while the upload data-rate requirements are not as severe.

A user of a particular wireless subscriber unit may subscribe to a service that requires relatively high bandwidth. In order to service these high-speed data communication requirements, in particular the larger download data-rate requirements, the IS-95B, and 1xRTT standards contemplate multiple download channels, i.e., fundamental traffic channels (FCHs) and supplemental traffic channels (SCHs). The SCH is a channel that is allocated to a particular wireless subscriber unit to augment the FCH. In some standards, the SCH provides variable rate data service, e.g., 19.2 kbps, 38.4 kbps, 76.8 kbps, 153.6 kbps, and 307.2 kbps, among other data rates.

The data rate that can be provided via a particular SCH is based upon the signal quality as seen by a serviced wireless subscriber unit. The signal quality will depend upon the distance of the wireless subscriber unit from its servicing base station, the maximum transmit power that the servicing base station can provide for the channel, the propagation path characteristics from the base station to the wireless subscriber unit, and the noise present at the wireless subscriber unit, among other factors. Thus, if the signal quality that may be provided is high, the SCH will support a relatively higher data rate by using a relatively higher symbol rate. If the signal quality that may be provided is low, the SCH will support a relatively lower data rate by using a lower symbol rate.

Various techniques have been developed to manage FCHs and SCHs in such a cellular wireless system 100. One such technique is included in the operations referred to as the Radio Resource Management (RRM) operations. Using the RRM operations, considering the signal quality available as well as a number of other considerations, a supportable data rate for the SCH is determined. Considerations in determining the supportable data rate include the available transmit power, system-wide interference levels, resources available in the BSC and the base station, and other considerations. The supportable data rate for the given channel is expected to yield a particular Frame Error Rate (FER) for serviced physical layer data frames, e.g., 1%, 5%, etc. In a conventional system, the supportable data rate is used for the SCH and provides data throughput at the supportable data rate with the expected FER.

Thus, for example, if data terminal 132 is downloading a large data file, receiving streaming audio, or watching an audiovisual presentation, for example, base station 105 will service its wireless data communications. Both the FCH and one or more SCHs are employed to service this wireless data communication for the data terminal 132. Using conventional techniques, the RRM operations would yield a supportable data rate to use for the SCH servicing the data communications. At this supportable data rate for the SCH, an expected FER would result, e.g., 1%, 5%, etc. The BSC 152 and the base station 105 would work in cooperation to service these data communications at the supportable data rate. However, if a SCH is being serviced and another data user requests access to the cellular wireless system 100, it may not be able to service the data user request and the data user will be blocked.

The RRM allows the operator of the cellular wireless system 100 to specify a maximum power usage for both voice and data. These limits are referred to as $T_v$ and $T_d$, respectively. The RRM also allows the operator to specify a fraction of the forward link data user transmit power that is reserved for data user FCH use. This fraction is denoted $f_d$. Reservation of some power for FCHs decreases the probability that a single data user can prevent the admission of other data users during a high-power SCH burst. However reserving power for FCHs decreases the probability of blocking at the expense of a decrease in the pool of power available for SCHs, and therefore at the expense of the peak data rate available to data users. Simulation work performed by the inventors of the present invention indicates that the value of $f_d$ that yields 1% data call blocking varies considerably, from a low of 10%, to a high in excess of 40%, depending upon the mixture of voice users and data users in a particular cell/sector. Generally, as a serviced cell/sector changes from being dominated by voice traffic to being dominated by data traffic, the RF loading that gives the highest throughput decreases from 70% (for nearly all voice) to 50% (for nearly all data). Table 1 provides relevant information for this study, including the fraction of reserved data FCH power, $f_d$. Based upon this study, it has been concluded that it is difficult for operators to properly choose $f_d$, since a value that achieves low blocking and high throughput under one set of conditions (or at one time of the day), may be a poor choice in different conditions, or at a different time.

TABLE 1

Optimum $f_d$ Values for Different Voice and Data Traffic Mixtures.

| Loading | Carried Voice (erlangs) | Carried Data (kb/s) | $T_{FCH}$ | $T_{SCH}$ | Num Mobiles | Blocking | Per-User Rate (kb/s) | $T_v$ | $T_d$ | $f_d$ |
|---|---|---|---|---|---|---|---|---|---|---|
| 40% | 0.00 | 164 | 75.0% | 52.5% | 92 | 1.0% | 151 | 0% | 100% | 30% |
| 40% | 2.28 | 133 | 65.0% | 58.5% | 75 | 0.6% | 156 | 13% | 87% | 10% |
| 40% | 7.40 | 45 | 55.0% | 49.5% | 25 | 0.0% | 159 | 27% | 73% | 10% |
| 40% | 8.81 | 0 | | | | | | 100% | 0% | |
| 50% | 0.00 | 185 | 75.0% | 43.4% | 106 | 1.0% | 111 | 0% | 100% | 42% |
| 50% | 2.28 | 175 | 65.0% | 48.4% | 99 | 1.0% | 132 | 13% | 87% | 26% |

TABLE 1-continued

Optimum $f_d$ Values for Different Voice and Data Traffic Mixtures.

| Loading | Carried Voice (erlangs) | Carried Data (kb/s) | $T_{FCH}$ | $T_{SCH}$ | Num Mobiles | Blocking | Per-User Rate (kb/s) | $T_v$ | $T_d$ | $f_d$ |
|---|---|---|---|---|---|---|---|---|---|---|
| 50% | 6.62 | 125 | 55.0% | 49.5% | 70 | 0.7% | 147 | 27% | 73% | 10% |
| 50% | 11.49 | 54 | 45.0% | 40.5% | 30 | 0.1% | 150 | 40% | 60% | 10% |
| 50% | 14.68 | 0 | | | | | | 100% | 0% | |
| 60% | 0.00 | 152 | 75.0% | 33.8% | 93 | 1.0% | 51 | 0% | 100% | 55% |
| 60% | 1.66 | 128 | 65.0% | 26.8% | 80 | 1.0% | 38 | 13% | 87% | 59% |
| 60% | 5.09 | 95 | 55.0% | 19.0% | 59 | 1.0% | 30 | 27% | 73% | 66% |
| 60% | 9.83 | 76 | 45.0% | 19.7% | 46 | 1.0% | 56 | 40% | 60% | 56% |
| 60% | 14.04 | 54 | 35.0% | 24.5% | 31 | 1.0% | 106 | 53% | 47% | 30% |
| 60% | 20.55 | 0 | | | | | | 100% | 0% | |
| 70% | 0.00 | 132 | 75.0% | 22.5% | 88 | 2.9% | 12 | 0% | 100% | 70% |
| 70% | 1.09 | 126 | 65.0% | 6.5% | 86 | 7.9% | 10 | 13% | 87% | 90% |
| 70% | 4.35 | 105 | 55.0% | 5.5% | 72 | 9.7% | 10 | 27% | 73% | 90% |
| 70% | 7.40 | 86 | 45.0% | 13.5% | 60 | 13.4% | 12 | 40% | 60% | 70% |
| 70% | 11.49 | 60 | 35.0% | 3.5% | 42 | 11.3% | 10 | 53% | 47% | 90% |
| 70% | 15.76 | 33 | 25.0% | 2.5% | 24 | 17.1% | 10 | 67% | 33% | 90% |
| 70% | 26.42 | 0 | | | | | | 100% | 0% | |

Thus, according to the present invention, a method of automatically adjusting the power reserved for data FCHs is presented. The algorithm slowly adjusts the $f_d$ value in each sector independently so that the FCH reserved power is as small as possible while still keeping the blocking low (below some target value). This has the effect of maximizing per-user throughput, which is a critical component of subscriber grade of service. In prior systems, $f_d$ is a single data-filled value, distributed to all base stations (BTSs). According to the present invention, this single value is replaced with a maximum and a minimum value, $f_{d,max}$ and $f_{d,min}$, and an algorithm to control a time-dependent value of $f_d$ between these extremes is enacted. The automatic adaptation of $f_d$ can be disabled by reverting to the fixed value that is currently used. Also, the adaptive algorithm can be set conservatively, by setting $f_{d,max}$ and $f_{d,min}$ close to each other, and close to the fixed value of $f_d$ recommended previously.

According to the present invention, the time-variant $f_d$ is initialized to $f_{d,max}$ or $f_{d,min}$, or somewhere in between, as desired. To adapt the value of $f_d$ between the limits, there are a number of possibilities. In each case, if the algorithm causes the value of $f_d$ to fall above $f_{d,max}$ or below $f_{d,min}$, the algorithm caps the dynamic value.

According to a first embodiment of the present invention, a method similar to that used by outer loop power control is employed to keep the FCH blocking rate at a certain percentage. Each time that a data call is admitted successfully, $f_d$ is decreased by some quantity $P_B \cdot \Delta$, where $P_B$ is the desired probability of blocking, and $\Delta$ is some step size. When a data call is blocked, $f_d$ is increased by $\Delta$. These operations keep the long-term value of $f_d$ at the lowest level that can maintain the desired blocking probability.

According to a second embodiment of the present invention, $f_d$ is adjusted based upon a measure of the current fraction of available data power used by FCHs. For example, if the measured fraction of available data power used by FCHs is $f_{d,meas}$, then set $f_d = A*f_{d,meas}$, where A is some multiple (greater than one) that ensures extra power for the admission of new FCHs. This operation essentially keeps the blocking probability at zero while the dynamic value of $f_d$ is between its upper and lower limits.

Figure 2:
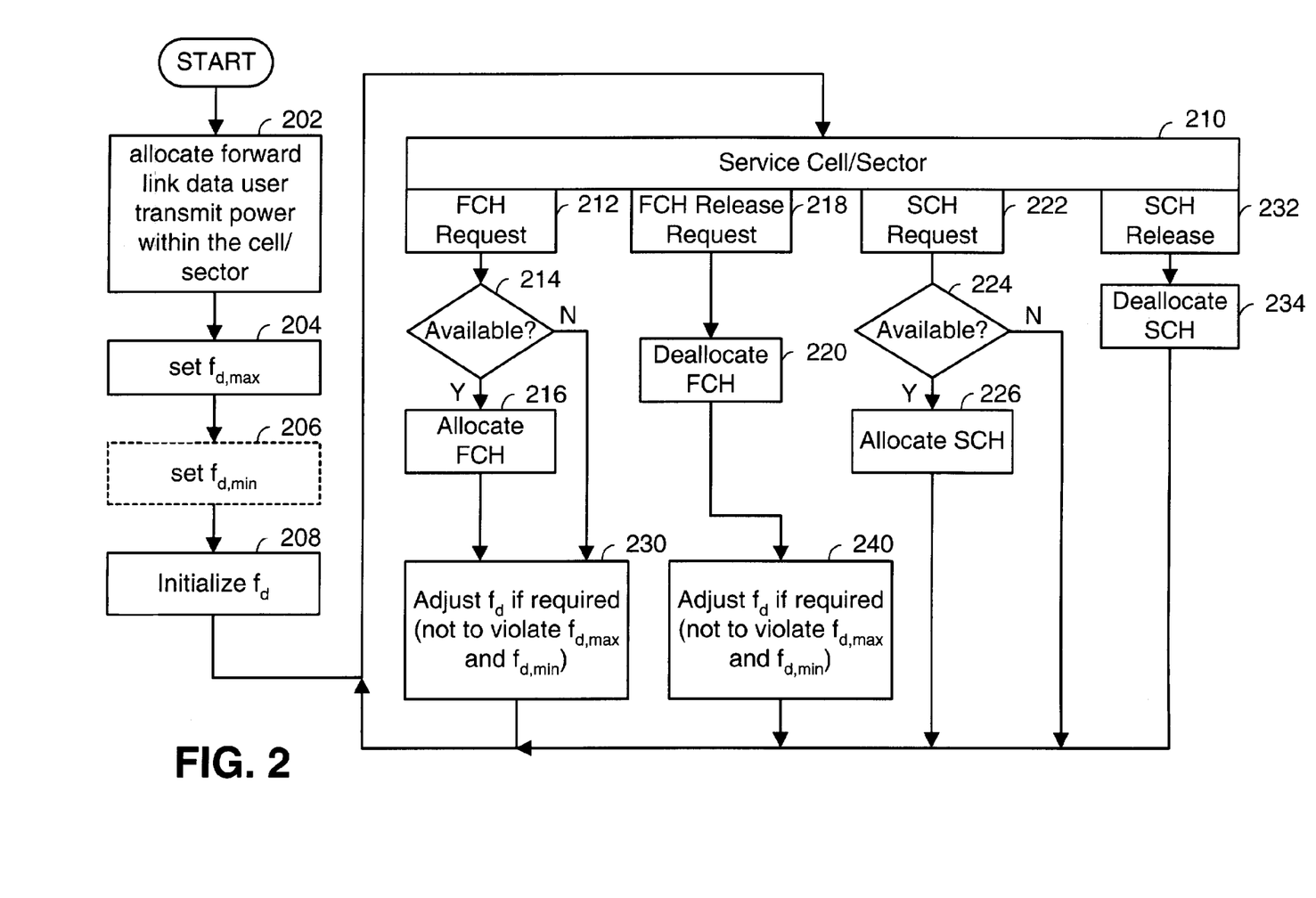
FIG. 2 is a logic diagram illustrating operation according to the present invention.

FIG. 2 is a logic diagram illustrating operation according to the present invention. Operation commences with first allocating a base station's data user forward link transmit power within the cell/sector, wherein the data user forward link transmit power is the total forward link transmit power that may be allocated to data users within the cell/sector (step 202). The method then includes setting a data user FCH forward link transmit power reserve level upper limit $f_{d,max}$ that is a maximum portion of the data user forward link transmit power that may be reserved for allocation to data users on FCHs within the cell/sector (step 204). The method then optionally includes setting a data user FCH forward link transmit power reserve level lower limit $f_{d,min}$ (step 206). $f_{d,min}$ is a minimum portion of the data user forward link transmit power that may be reserved for allocation to data users on FCHs within the cell/sector. Next, the method includes setting an initial data user FCH forward link transmit power reserve level $f_d$ to a value that is less than or equal to the data user FCH forward link transmit power reserve level upper limit and, if a data user FCH forward link transmit power reserve level lower limit is implemented, greater than or equal to the data user FCH forward link transmit power reserve level lower limit (step 208).

Operation then proceeds to step 210 where the base station services its cell/sector(s) (step 210). From step 210, the base station is operated to allocate FCHs to data users within the cell/sector, deallocate FCHs to data users within the cell/sector, allocate SCHs to data users within the cell/sector, and to deallocate SCHs to data users within the cell/sector. In these operations, SCHs are allocated so that the data user FCH forward link transmit power reserve level is maintained. Further, based upon at least one current data user operating condition in the cell/sector, the data user FCH forward link transmit power reserve level $f_d$ is adjusted. In making these adjustments, the method prevents the data user FCH forward link transmit power reserve level $f_d$ from violating $f_{d,max}$ and $f_{d,min}$.

Figure 3:
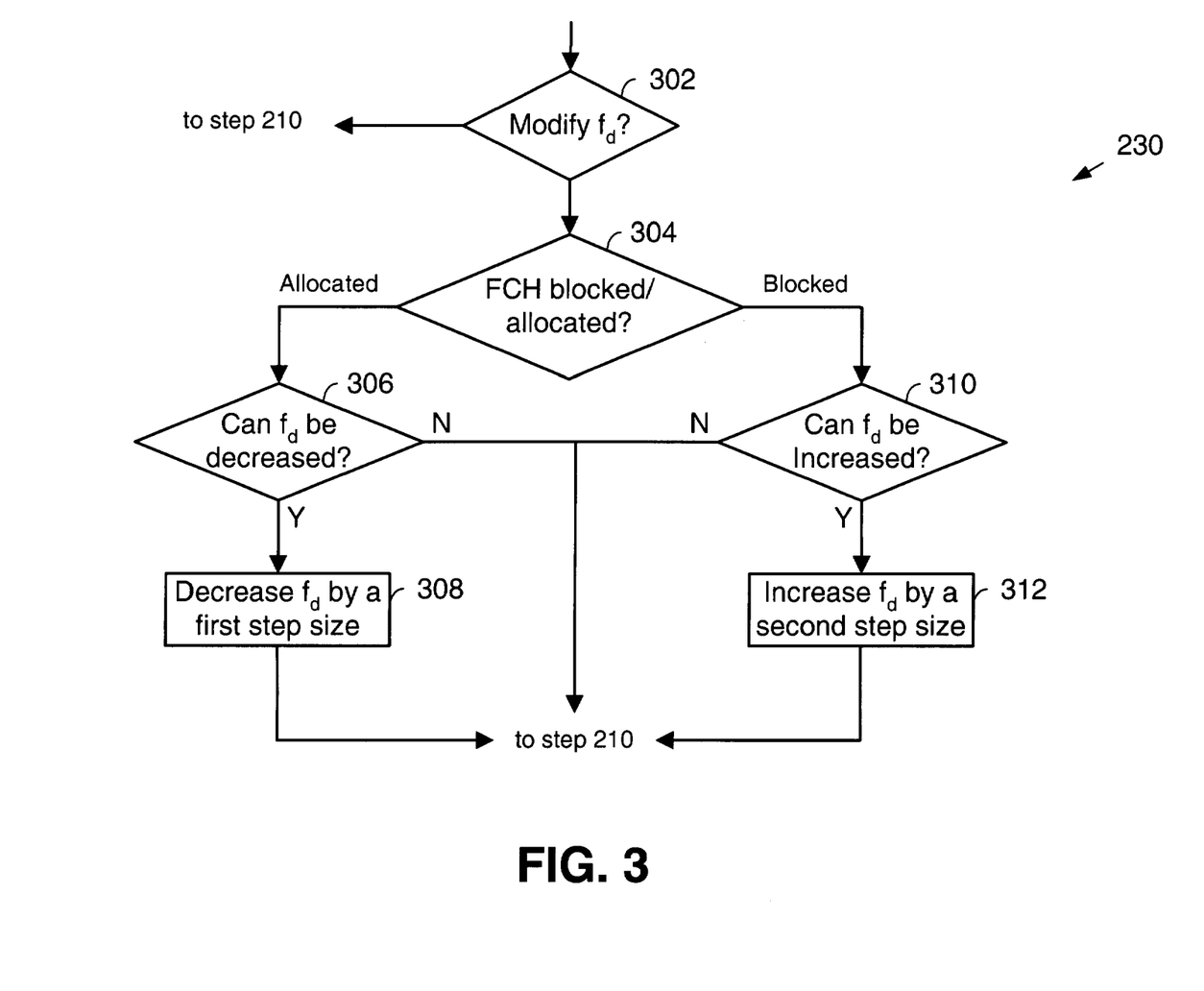
FIG. 3 is a flow chart illustrating in detail a first embodiment of the operations of FIG. 2.
Figure 4:
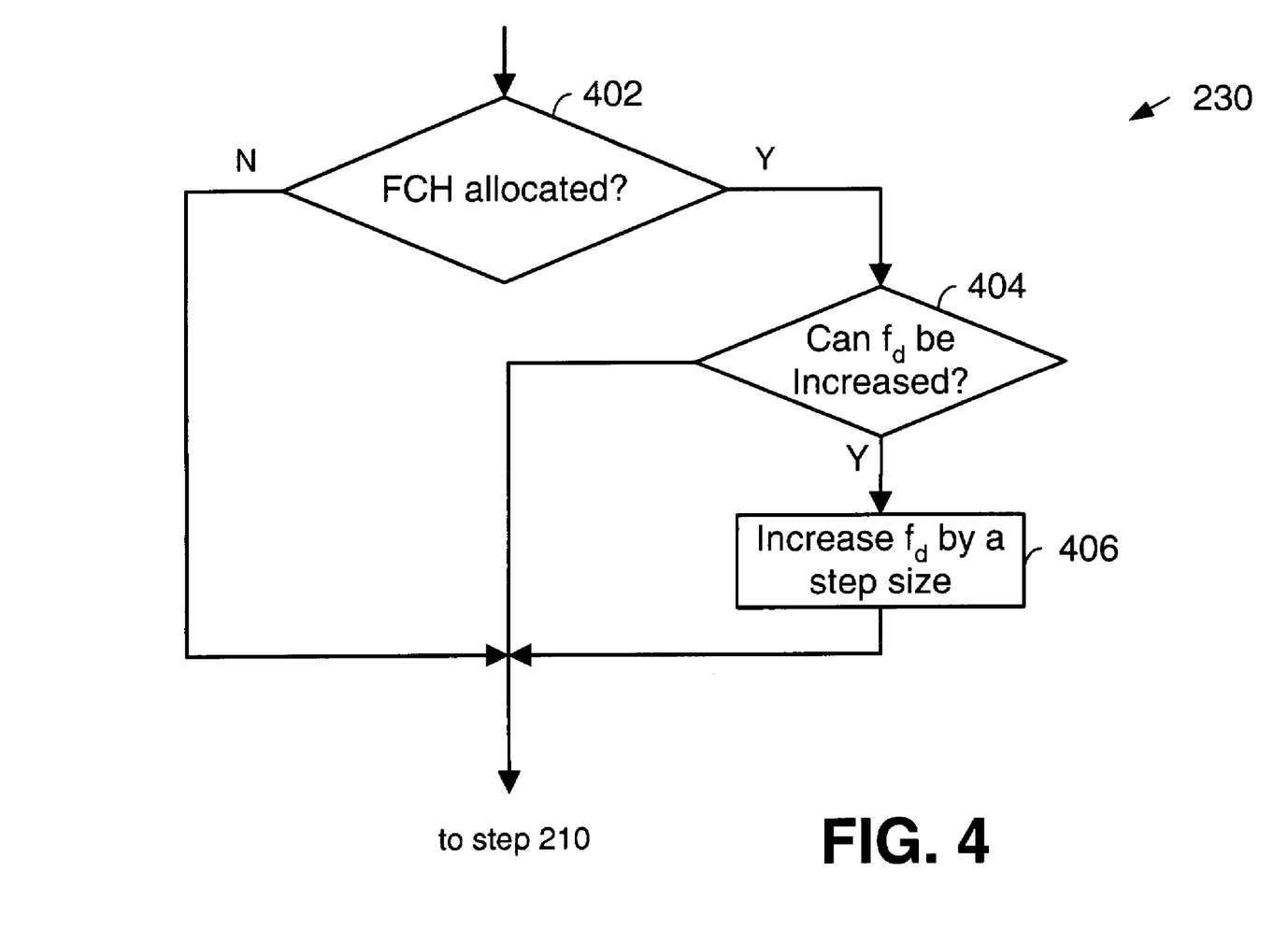
FIG. 4 is a flow chart illustrating in detail a second embodiment of the operations of FIG. 2.
Figure 9:
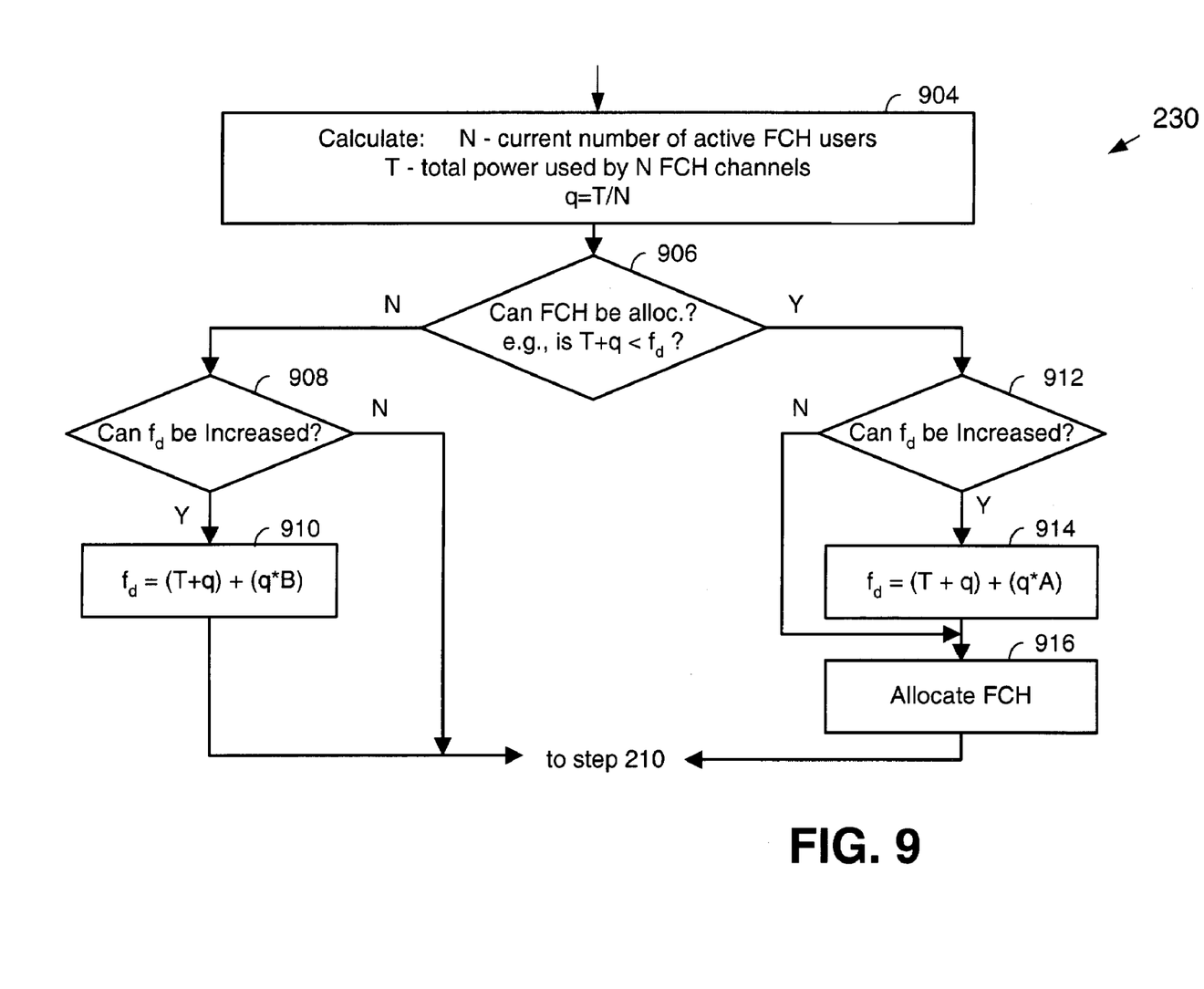
FIG. 9 is a flow chart illustrating in detail a third embodiment of the operations of the present invention.

From step 210, the base station may receive a FCH request (step 212). If a FCH is available for the requesting data user (as determined at step 214), the FCH is allocated (step 216) and operation proceeds to step 230. If a FCH is not available (as determined at step 214), the data user is blocked and operation proceeds to step 230. Embodiments of the operations of step 230 are illustrated in FIGS. 3, 4, and 9.

From step 210, the base station may receive a SCH request (step 218). If a SCH is available for the requesting data user (as determined at step 220), the SCH is allocated (step 222) for a period of time, and operation proceeds to step 230. If a SCH is not available (as determined at step 220), the requesting data user is blocked from the SCH and operation proceeds to step 210.

From step 210, the base station may also release a FCH (step 226). When the FCH is released, the FCH is deallocated (step 228) and operation proceeds to step 240. At step 240, the base station (or base station controller) adjusts $f_d$, if required. In adjusting $f_d$, any adjustment is performed so not as to violate $f_{d,max}$ and $f_{d,min}$ and in an effort to maximize cell/sector throughput while and also in an effort to minimize data user FCH blocking. One embodiment of the operations of step 240 is illustrated further with reference to FIG. 10.

From step 210, the base station may also release a SCH (step 232). When the SCH is released, the SCH is deallocated (step 234) and operation proceeds to step 210.

With the method of the present invention, in adjusting the data user FCH forward link transmit power reserve level $f_d$ based upon at least one current operating condition in the cell/sector, the method may be accomplished according to a number of embodiments. In a first embodiment of this operation, when a data call is admitted successfully, the method includes decreasing the data user FCH forward link transmit power reserve level $f_d$ by a first step size. Further, with this first embodiment, when a data call is blocked, the method includes increasing the data user FCH forward link transmit power reserve level $f_d$ by a second step size. In this first embodiment, the first step size may be proportional to a desired probability of data call blocking. Further, the second step size may be selected to meet a desired maximum rate at which the FCH forward link transmit power reserve level is allowed to increase. In a second embodiment of this operation, adjusting the data user FCH forward link transmit power reserve level includes adjusting the data user FCH forward link transmit power reserve level $f_d$ to a level that exceeds a current usage level of data user FCH forward link transmit power by a configurable proportionality factor. This second embodiment will minimize data user FCH blocking until the limit $f_{d,max}$ is reached.

FIG. 3 is a flow chart illustrating in detail a first embodiment of the operations of FIG. 2. In particular FIG. 3 illustrates a first embodiment of the operations of step 230 of FIG. 2. With this first embodiment, a determination is first made whether to modify $f_d$ (step 302). If $f_d$ does not require modification, operation returns to step 210. However, if $f_d$ does require modification, a determination is next made as to whether most recently a FCH was allocated or a FCH was blocked (step 304). If the FCH was most recently allocated, the method next determines whether $f_d$ can be decreased, i.e., is it equal to $f_{d,min}$ (step 306). If $f_d$ cannot be decreased, operation proceeds to step 210. If $f_d$ can be decreased, it is decreased by a first step size (step 308). If in step 308 the resulting value of $f_d$ is lower than $f_{d,min}$, the value of $f_d$ is set equal to $f_{d,min}$, after which operation returns to step 210.

If the FCH was most recently blocked, the method next determines whether $f_d$ can be increased, i.e., is it equal to $f_{d,max}$ (step 310). If $f_d$ cannot be increased, operation proceeds to step 210. If $f_d$ can be increased, it is increased by a second step size (step 312). If in step 312 the resulting value of $f_d$ is larger than $f_{d,max}$, the value of $f_d$ is set equal to $f_{d,max}$, after which operation returns to step 210. In this first embodiment, the first step size may be proportional to a desired probability of data call blocking. Further, the second step size may be selected to meet a desired maximum amount at which the FCH forward link transmit power reserve level is allowed to increase at one time.

FIG. 4 is a flow chart illustrating in detail a second embodiment of the operations of FIG. 2. In a second embodiment of this operation, adjusting the data user FCH forward link transmit power reserve level includes adjusting the data user FCH forward link transmit power reserve level $f_d$ to a level that exceeds a current usage level of data user FCH forward link transmit power by a configurable proportionality factor. This second embodiment will minimize data user FCH blocking until the limit $f_{d,max}$ is reached.

With the second embodiment step 230 therefore includes first determining whether a FCH was allocated (step 402). If not, operation proceeds to step 408. If so, it is next determined whether $f_d$ can be increased, i.e., is it equal to $f_{d,max}$ (step 404). If $f_d$ cannot be increased, operation proceeds to step 210. If $f_d$ can be increased, it is increased by a step size that makes $f_d$ proportional to the new total FCH data power by a proportionality constant A (step 406). If in step 406 the resulting value of $f_d$ is larger than $f_{d,max}$, the value of $f_d$ is set equal to $f_{d,max}$, after which operation returns to step 210. If it was determined in step 402 that an FCH was not allocated, it is next determined whether a FCH was deallocated (step 408). If not, operation proceeds to step 210. If so, it is next determined whether $f_d$ can be decreased, i.e., is it equal to $f_{d,min}$ (step 410). If $f_d$ can be decreased it is decreased by a step size that makes $f_d$ proportional to the new total FCH data power by a proportionality constant A (step 412). If in step 412 the resulting value of $f_d$ is smaller than $f_{d,min}$, the value of $f_d$ is set equal to $f_{d,min}$.

Figure 5:
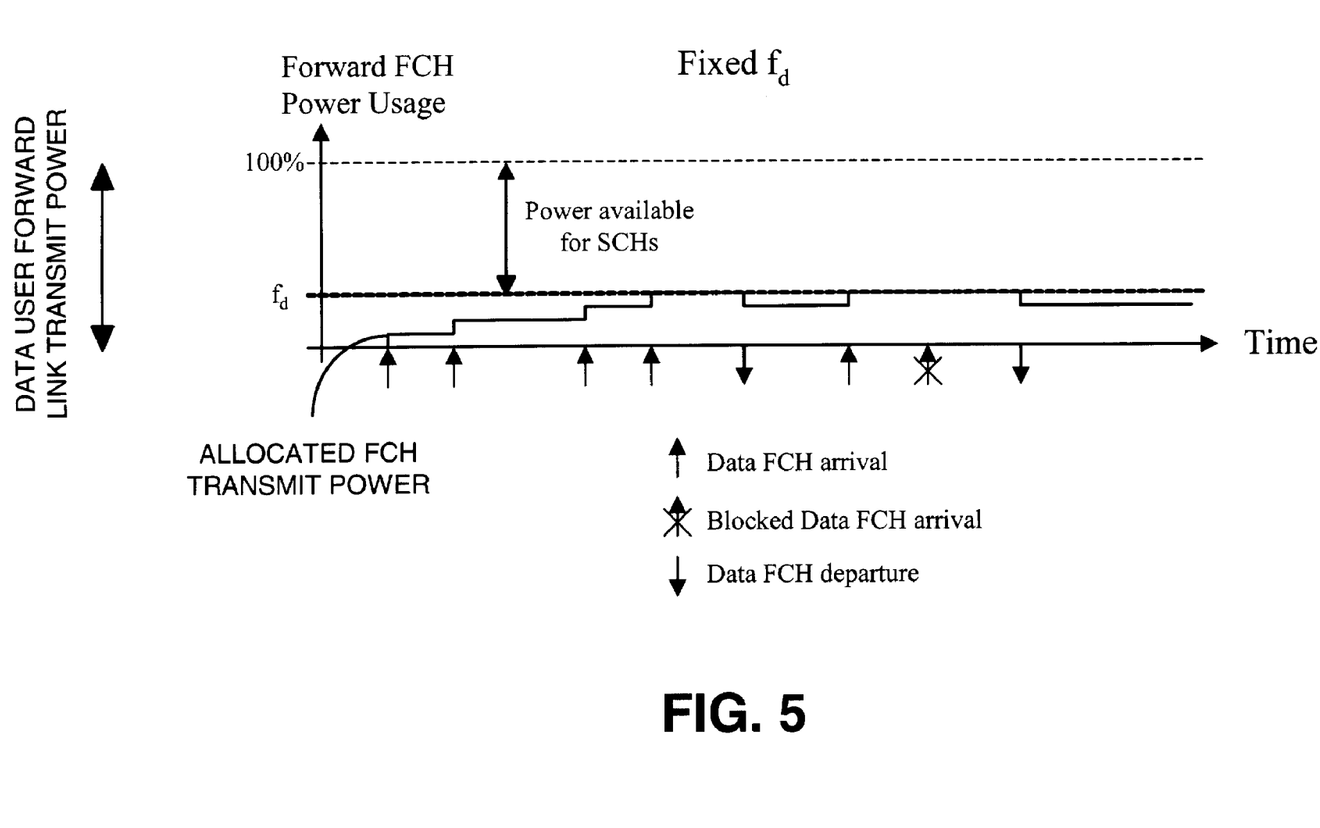
FIG. 5 is a graph illustrating the operation of a cell/sector in a cellular wireless system having a fixed data user FCH forward link transmit power reserve level.

FIG. 5 is a graph illustrating the operation of a cell/sector in a cellular wireless system having a fixed data user FCH forward link transmit power reserve level. With $f_d$ being fixed, a data user will be blocked from being allocated a FCH when the actual allocated FCH transmit power reaches $f_d$. Not only will the data user be blocked, the data user may be blocked for no reason simply due to the setting of $f_d$. That is, there may be excess power and Walsh codes available to serve the blocked user, resulting in an underutilization of resources.

Figure 6:
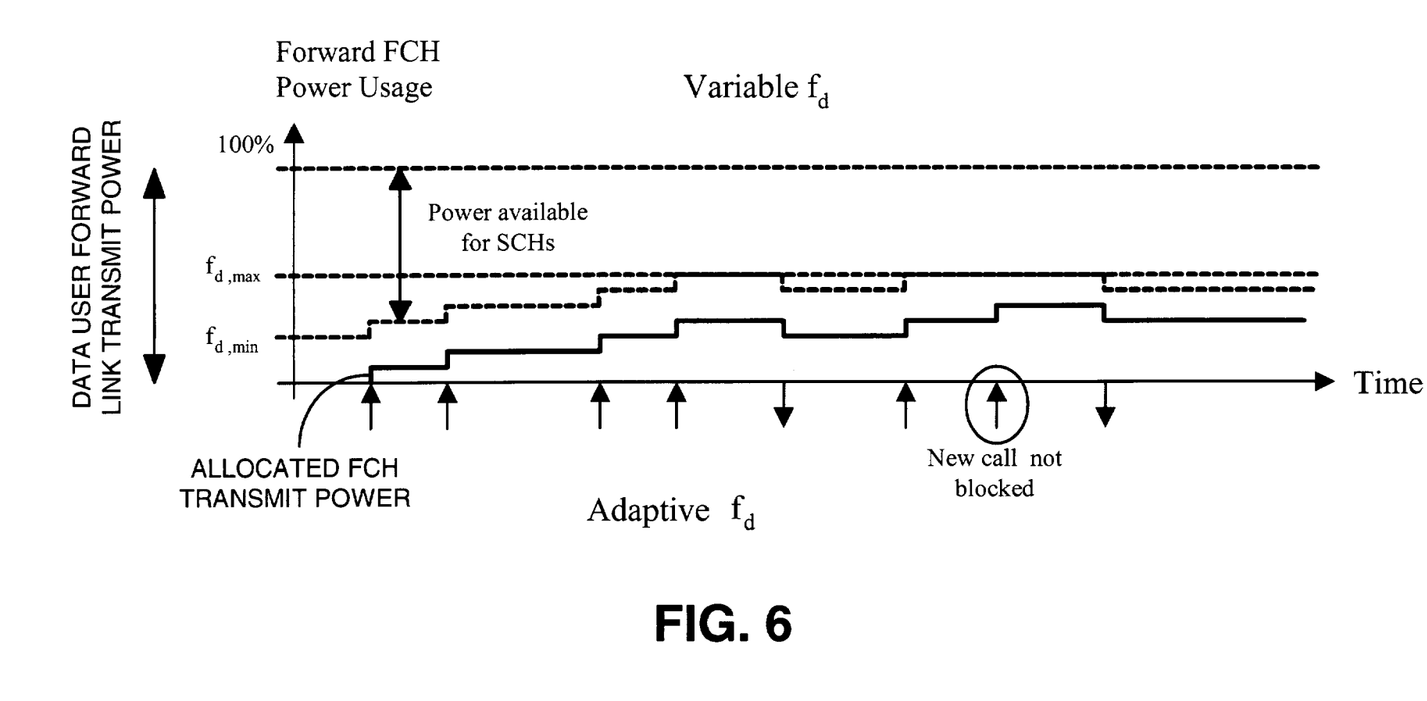
FIG. 6 is a graph illustrating the operation of a cell/sector in a cellular wireless system having a variable data user FCH forward link transmit power reserve level according to the present invention.

FIG. 6 is a graph illustrating the operation of a cell/sector in a cellular wireless system having a variable data user FCH forward link transmit power reserve level according to the present invention. With the operation of FIG. 6, $f_d$ is dynamically set between $f_{d,min}$ and $f_{d,max}$ based upon system conditions. With these operations, because $f_d$ is dynamically altered based upon system conditions, data user FCH blockage is minimized and data throughput for the cell/sector is maximized.

Figure 7:
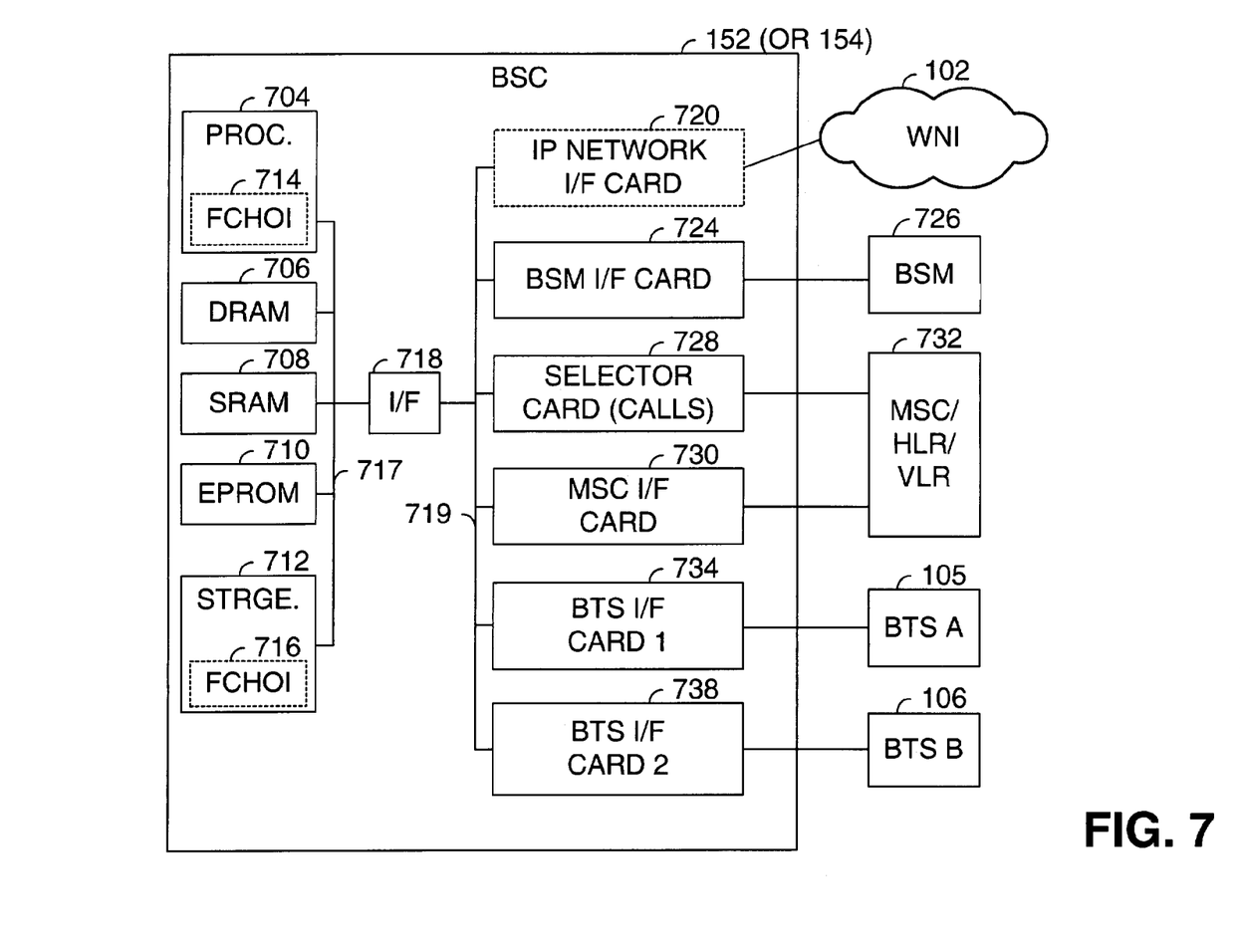
FIG. 7 is a block diagram illustrating a Base Station Controller (BSC) constructed according to the present invention.

FIG. 7 is a block diagram illustrating a Base Station Controller (BSC) constructed according to the present invention. The structure and operation of BSCs is generally known. The BSC 152 (or 154) services circuit switched and/or packet switched operations. In some cases, the BSC 152 is called upon to convert data between circuit switched and data switched formats, depending upon the types of equipment coupled to the BSC 152. The components illustrated in FIG. 7, their function, and the interconnectivity may vary without departing from the teachings of the present invention.

The BSC 152 includes a processor 704, dynamic RAM 706, static RAM 708, EPROM 710, and at least one data storage device 712, such as a hard drive, optical drive, tape drive, etc. These components intercouple via a local bus 717 and couple to a peripheral bus 719 via an interface 718. Various peripheral cards couple to the peripheral bus 719. These peripheral cards include a wireless network infrastructure interface card 720, a base station manager interface card 724, at least one selector card 728, an MSC interface card 730, and a plurality of BTS interface cards 734 and 738.

The wireless network infrastructure interface card 720 couples the BSC 152 to wireless network infrastructure 102. The base station manager interface card 724 couples the BSC 152 to a Base Station Manager 726. The selector card 728 and MSC interface card 730 couple the BSC 152 to an MSC/HLR/VLR 732. The BTS interface cards 734 and 738 couple the BSC 152 to base stations 105 and 106, respectively.

FCH Operating Instructions (FCHOI) 716 and 714, along with the BSC 152 hardware, enable the BSC 152 to manage the FCH operating parameters of base stations 105 and 106 that it controls. The FCHOI 716 are loaded into the storage unit 712 and, upon execution, some or all of the FCHOI 714 are loaded into the processor 704 for execution. During this process, some of the FCHOI 716 may be loaded into the DRAM 706.

Figure 8:
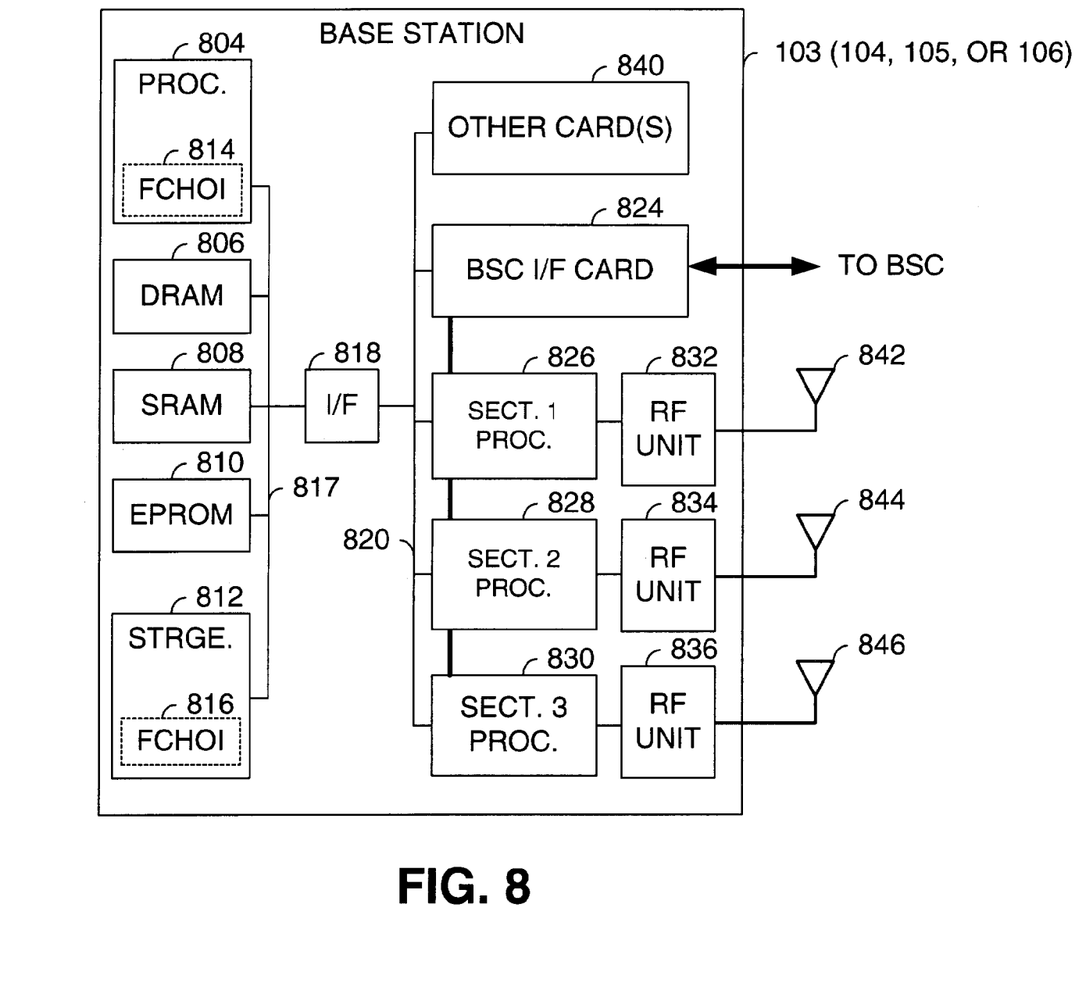
FIG. 8 is a block diagram illustrating a base station constructed according to the present invention.

FIG. 8 is a block diagram illustrating a base station constructed according to the present invention. The base station 103 (104, 105, or 106) includes a processor 804, dynamic RAM 806, static RAM 808, EPROM 810, and at least one data storage device 812, such as a hard drive, optical drive, tape drive, etc. These components (which may be contained on a peripheral processing card or module) intercouple via a local bus 817 and couple to a peripheral bus 820 (which may be a back plane) via an interface 818. Various peripheral cards couple to the peripheral bus 820. These peripheral cards include a BSC interface card 824, which couples the base station 802 to its servicing BSC 152.

Digital processing cards 826, 828 and 830 couple to Radio Frequency (RF) units 832, 834, and 836, respectively. Each of these digital processing cards 826, 828, and 830 performs digital processing for a respective sector, e.g., sector 1, sector 2, or sector 3, serviced by the base station 802. The RF units 832, 834, and 836 couple to antennas 842, 844, and 846, respectively, and support wireless communication between the base station 802 and wireless subscriber units. Further, the RF units 832, 834, and 836 operate according to the present invention. The base station 802 may include other card(s) 840 as well.

FCH Operating Instructions (FCHOI) 816 and 814 enable the BSC 802 to perform the operations of the present invention. The FCHOI 816 are loaded into the storage unit 812 and, upon their execution, some or all of the FCHOI 814 are loaded into the processor 804 for execution. During this process, some of the FCHOI 816 may be loaded into the DRAM 806.

FIG. 9 is a flow chart illustrating in detail a third embodiment of the operations of step 230 of the present invention. According to the third embodiment, after the allocation of a FCH, calculations are performed to determine the average FCH transmit power currently in use, i.e., total active FCH transmit power divided by the number of active FCH users (step 904). Then, a determination is made as to whether a FCH can be allocated, i.e., if the requested FCH allocation is made would cause the FCH forward link transmit power to exceed $f_d$, e.g., is T+q<$f_d$ (step 906). If the requested FCH allocation cannot be made, it is next determined whether $f_d$ can be increased (step 908) and, if it can, $f_d$ is increased by a first amount (step 910). If $f_d$ cannot be increased, as determined at step 908, and from step 910, operation returns to step 210. If the requested FCH allocation can be made, it is next determined whether $f_d$ can be increased (step 912) and, if it can, $f_d$ is increased by a second amount (step 914) from both step 912 and step 914 operation proceeds to step 210 after the FCH allocation is made at step 916. The third embodiment may be performed such that $f_d$ is increased by a lesser amount when the FCH can be allocated than when it cannot be allocated. Alternately, the third embodiment may be performed such that $f_d$ is increased by a greater amount when the FCH can be allocated than when it cannot be allocated.

Figure 10:
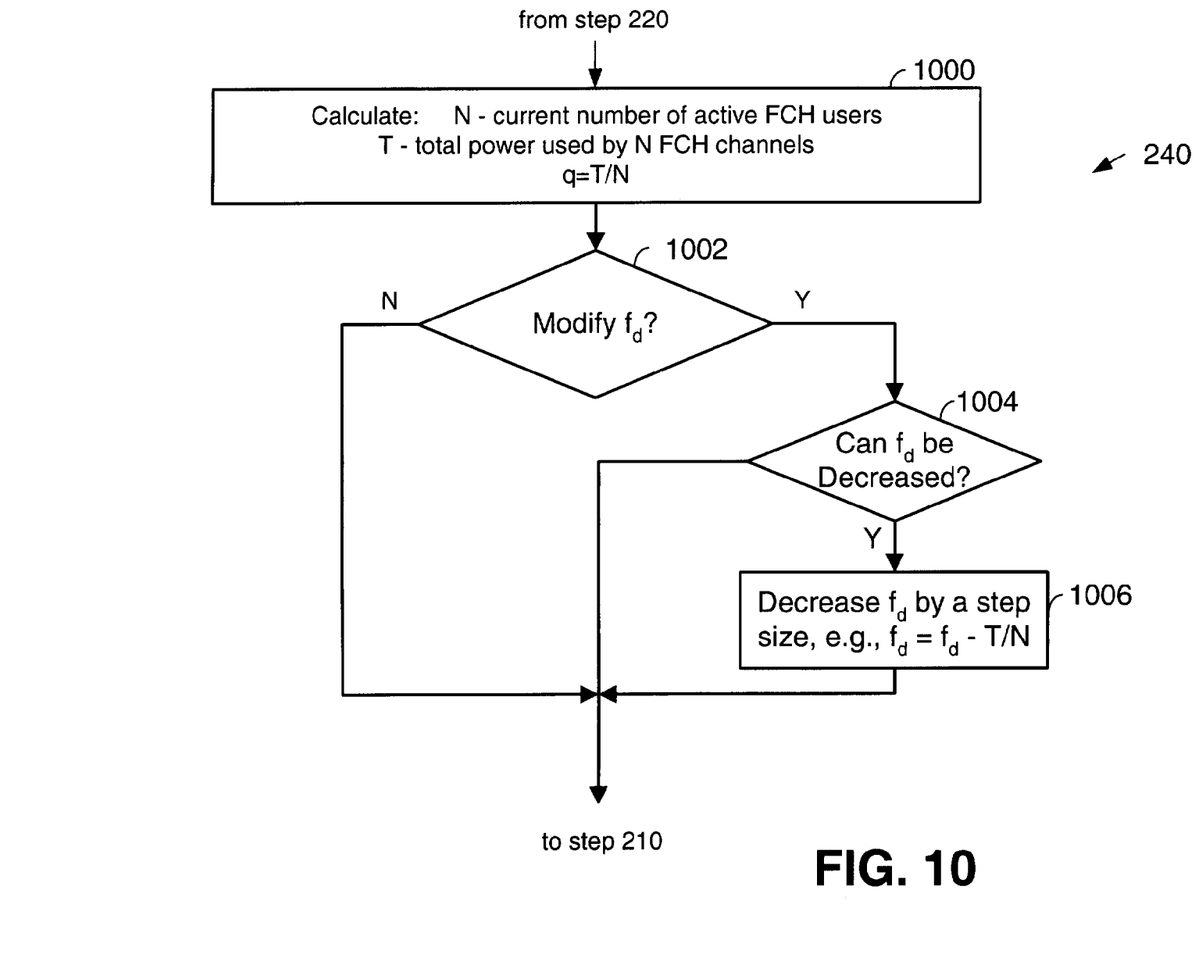
FIG. 10 is a flow chart illustrating in detail a fourth embodiment of the operations of the present invention.

FIG. 10 is a flow chart illustrating in detail a fourth embodiment of the operations of the present invention. In particular, the operations of FIG. 10 described one embodiment of the operations that were generally described at step 240 of FIG. 2. With these operations, calculations are first performed to determine the average FCH transmit power currently in use, i.e., total active FCH transmit power divided by the number of active FCH users (step 1000). Then, a determination is made as to whether $f_d$ is to be modified (step 1002). If not, operation returns to step 210. If so, it is next determined whether $f_d$ can be decreased (step 1004). If so, $f_d$ is decreased by a step size, e.g., $f_d = f_d - T/N$ (step 1006). If not, operation returns to step 210. Further, after $f_d$ is decreased at step 1006, operation returns to step 210.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

The invention claimed is:

1. A method for servicing data communications in a cell/sector of a digital cellular wireless system, the method comprising:

allocating data user forward link transmit power within the cell/sector, wherein the data user forward link transmit power is a total forward link transmit power that may be allocated to data users within the cell/sector;

setting a data user Fundamental Channel (FCH) forward link transmit power reserve level upper limit that is a maximum portion of the data user forward link transmit power that may be reserved for allocation to data users on FCHs within the cell/sector;

setting a data user FCH forward link transmit power reserve level to a value that is less than or equal to the data user FCH forward link transmit power reserve level upper limit;

allocating FCHs to the data users within the cell/sector upon request;

deallocating the FCHs to the data users within the cell/sector;

allocating Supplemental Channels (SCHs) to the data users within the cell/sector upon request, wherein the SCHs are allocated so that the data user FCH forward link transmit power reserve level is maintained;

deallocating the SCHs to the data users within the cell/sector;

based upon at least one current data user operating condition in the cell/sector, adjusting the data user FCH forward link transmit power reserve level; and preventing the data user FCH forward link transmit power reserve level from exceeding the data user FCH forward link transmit power reserve level upper limit.

2. The method of claim 1, further comprising:
   setting a data user FCH forward link transmit power reserve level lower limit that is a minimum portion of the data user forward link transmit power that may be reserved for the FCH allocation to the data users within the cell/sector; and
   preventing the data user FCH forward link transmit power reserve level from being less than the data user FCH forward link transmit power reserve level lower limit.

3. The method of claim 1, wherein based upon at least one current data user operating condition in the cell/sector, adjusting the data user FCH forward link transmit power reserve level comprises:
   when a data call is admitted successfully, decreasing the data user FCH forward link transmit power reserve level by a first step size; and
   when a data call is blocked, increasing the data user FCH forward link transmit power reserve level by a second step size.

4. The method of claim 3, wherein the first step size is proportional to a desired probability of data call blocking, and the second step size is selected to limit the maximum rate at which the data user FCH forward link transmit power reserve level can increase.

5. The method of claim 1, wherein based upon at least one current operating condition in the cell/sector, adjusting the data user FCH forward link transmit power reserve level is performed to meet a desired blocking probability.

6. The method of claim 1, wherein based upon at least one current operating condition in the cell/sector, adjusting the data user FCH forward link transmit power reserve level comprises adjusting the data user FCH forward link transmit power reserve level to a level that exceeds a current usage level of data user FCH forward link transmit power by a configurable multiplicative constant.

7. The method of claim 1, further comprising supporting one or more versions of the 1xRTT communication standard and other wireless communication standards (e.g., 1xEV-DV, UMTS, etc.).

8. A base station that wirelessly services a plurality of voice users and a plurality of data users within a cell/sector of a digital cellular wireless system, the base station comprising:
   an antenna;
   a Radio Frequency unit coupled to the antenna; and
   at least one digital processor coupled to the Radio Frequency unit that executes software instructions causing the base station to:
   allocate data user forward link transmit power within the cell/sector, wherein the data user forward link transmit power is a total forward link power that may be allocated to data users within the cell/sector;
   set a data user Fundamental Channel (FCH) forward link transmit power reserve level upper limit that is a maximum portion of the data user forward link transmit power that may be reserved for allocation to data users on FCHs within the cell/sector;
   set a data user FCH forward link transmit power reserve level to a value that is less than or equal to the data user FCH forward link transmit power reserve level upper limit;
   allocate FCHs to the data users within the cell/sector upon request;
   deallocate the FCHs to the users within the cell/sector;
   allocate Supplemental Channels (SCHs) to data users within the cell/sector upon request, wherein the SCHs are allocated so that the data user FCH forward link transmit power reserve level is maintained;
   deallocate the SCHs to the data users the within the cell/sector;
   adjust the data user FCH forward link transmit power reserve level based upon at least one current data user operating condition in the cell/sector; and
   prevent the data user FCH forward link transmit power reserve level from exceeding the data user FCH forward link transmit power reserve level upper limit.

9. The base station of claim 8, wherein the base station further operates to:
   set a data user FCH forward link transmit power reserve level lower limit that is a minimum portion of the data user forward link transmit power that may be reserved for the FCH allocation to the data users within the cell/sector; and
   prevent the data user FCH forward link transmit power reserve level from being less than the data user FCH forward link transmit power reserve level lower limit.

10. The base station of claim 8, wherein in adjusting the data user FCH forward link transmit power reserve level based upon at least one current operating condition in the cell/sector, the base station operates to:
    decrease the data user FCH forward link transmit power reserve level by a first step size when a data call is admitted successfully; and
    increase the data user FCH forward link transmit power reserve level by a second step size when a data call is blocked.

11. The base station of claim 10, wherein the first step size is proportional to a desired probability of data call blocking, and the second step size is selected to limit the maximum rate at which the data user FCH forward link transmit power reserve level can increase.

12. The base station of claim 8, wherein in adjusting the data user FCH forward link transmit power reserve level based upon at least one current operating condition in the cell/sector, the base station operates to meet a desired blocking probability.

13. The base station of claim 8, wherein in adjusting the data user FCH forward link transmit power reserve level based upon at least one current operating condition in the cell/sector, the base station operates to adjust the data user FCH forward link transmit power reserve level to a level that exceeds a current usage level of data user FCH forward link transmit power by a configurable multiplicative constant.

14. The base station of claim 8, wherein the base station supports one or more versions of the 1xRTT communication standard.

15. A base station comprising:
    means for allocating data user forward link transmit power within a cell/sector, wherein the data user forward link transmit power is a total forward link power that may be allocated to data users within the cell/sector;
    means for setting a data user Fundamental Channel (FCH) forward link transmit power reserve level upper limit that is a maximum portion of the data user forward link transmit power that may be reserved for FCH allocation to the data users within the cell/sector;
    means for setting a data user FCH forward link transmit power reserve level to a value that is less than or equal to the data user FCH forward link transmit power reserve level upper limit;
    means for allocating FCHs to the data users within the cell/sector upon request;

means for deallocating the FCHs to the data users within the cell/sector;

means for allocating Supplemental Channels (SCHs) to data users within the cell/sector upon request, wherein the SCHs are allocated so that the data user FCH forward link transmit power reserve level is maintained;

means for deallocating the SCHs to the data users within the cell/sector;

means for adjusting the data user FCH forward link transmit power reserve level based upon at least one current data user operating condition in the cell/sector; and means for preventing the data user FCH forward link transmit power reserve level from exceeding the data user FCH forward link transmit power reserve level upper limit.

16. The base station of claim 15, further comprising:

means for setting a data user FCH forward link transmit power reserve level lower limit that is a minimum portion of the data user forward link transmit power that may be reserved for FCH allocation to the data users within the cell/sector; and means for preventing the data user FCH forward link transmit power reserve level from being less than the data user FCH forward link transmit power reserve level lower limit.

17. The base station of claim 15, wherein the means for adjusting the data user FCH forward link transmit power reserve level based upon at least one current data user operating condition in the cell/sector comprise:

means for decreasing the data user FCH forward link transmit power reserve level by a first step size when a data call is admitted successfully; and means for increasing the data user FCH forward link transmit power reserve level by a second step size when a data call is blocked.

18. The base station of claim 17, wherein the first step size is proportional to a desired probability of data call blocking, and the second step size is selected to limit the maximum rate at which the data user FCH forward link transmit power reserve level can increase.

19. The base station of claim 15, wherein the means for adjusting the data user FCH forward link transmit power reserve level based upon at least one current data user operating condition in the cell/sector operate to meet a desired blocking probability.

20. The base station of claim 15, wherein the means for adjusting the data user FCH forward link transmit power reserve level based upon at least one current data user operating condition in the cell/sector adjust the data user FCH forward link transmit power reserve level to a level that exceeds a current usage level of data user FCH forward link transmit power by a configurable multiplicative constant.

* * * * *